US009120697B2

(12) United States Patent
Fiorentini et al.

(10) Patent No.: US 9,120,697 B2
(45) Date of Patent: Sep. 1, 2015

(54) USE OF A GLASS COMPOSITION FOR MAKING A SOLAR COLLECTOR WITH A GLASS-METAL JOINT

(75) Inventors: Lorenzo Paolo Dante Fiorentini, Pisa (IT); Marco Soldani, Pisa (IT); Oliver Bellina, Pisa (IT)

(73) Assignee: Gerresheimer Pisa S.P.A., Pisa (IT)

( * ) Notice: Subject to any disclaimer, the term of this patent is extended or adjusted under 35 U.S.C. 154(b) by 293 days.

(21) Appl. No.: 13/518,433

(22) PCT Filed: Dec. 24, 2010

(86) PCT No.: PCT/IB2010/003348
§ 371 (c)(1),
(2), (4) Date: Aug. 9, 2012

(87) PCT Pub. No.: WO2011/092546
PCT Pub. Date: Aug. 4, 2011

(65) Prior Publication Data
US 2012/0324952 A1  Dec. 27, 2012

(30) Foreign Application Priority Data
Dec. 24, 2009  (IT) .............................. PI2009A000165

(51) Int. Cl.
*C03C 8/24* (2006.01)
*C03C 3/091* (2006.01)
(Continued)

(52) U.S. Cl.
CPC . *C03C 3/091* (2013.01); *C03C 8/24* (2013.01); *C03C 27/02* (2013.01); *C03C 27/044* (2013.01);
(Continued)

(58) Field of Classification Search
CPC ........ C03C 8/24; C03C 3/091; Y10T 428/131
USPC ................................. 501/14, 21, 66
See application file for complete search history.

(56) References Cited

U.S. PATENT DOCUMENTS

| 1,294,466 | A |   | 2/1919 | W.G. Houskeeper |
| 4,386,164 | A | * | 5/1983 | Moser ............................ 501/66 |

(Continued)

FOREIGN PATENT DOCUMENTS

| CN | 1594166 A | 3/2005 |
| DE | 10035801 A1 | 2/2002 |

(Continued)

OTHER PUBLICATIONS

WPI Database Document referencing CN1594166A in English, XP002581536, Mar. 16, 2005.
(Continued)

*Primary Examiner* — Karl Group
(74) *Attorney, Agent, or Firm* — McCormick, Paulding & Huber LLP

(57) ABSTRACT

Use of a glass composition to make a tubular glass body that is adapted to form a glass-metal joint in a tubular solar collector. The composition is a borosilicate glass having a dilatometric chart with a hard segment and a soft segment hysteresis where the soft segment glass transition temperature is less than the hard segment glass transition temperature for a temperature difference ΔT higher than 20° C. comprising 5% to 8% $Na_2O$, 0.1% to 3% $K_2O$, 0.1% to 1.5% CaO, 5% to 7.5% $Al_2O_3$, 70% to 75% $SiO_2$, and 11.6% to 13.7% $B_2O_3$.

1 Claim, 4 Drawing Sheets

(51) Int. Cl.
*C03C 27/02* (2006.01)
*C03C 27/04* (2006.01)
*F24J 2/05* (2006.01)
*F24J 2/46* (2006.01)

(52) U.S. Cl.
CPC ...... *F24J 2/055* (2013.01); *F24J 2/465* (2013.01); *F24J 2002/4681* (2013.01); *Y02E 10/44* (2013.01); *Y10T 428/131* (2015.01)

(56) References Cited

U.S. PATENT DOCUMENTS

| | | | |
|---|---|---|---|
| 6,324,870 | B1 | 12/2001 | Chabin et al. |
| 6,635,592 | B1 * | 10/2003 | Kosokabe et al. ............ 501/14 |
| 6,815,385 | B2 * | 11/2004 | Kosokabe et al. ............ 501/21 |
| 7,517,822 | B2 * | 4/2009 | Fechner et al. ............... 501/67 |
| 2003/0087745 | A1 | 5/2003 | Peuchert et al. |
| 2005/0181925 | A1 | 8/2005 | Kuckelkorn et al. |
| 2011/0094584 | A1 | 4/2011 | Sawada et al. |
| 2013/0005560 | A1 * | 1/2013 | Martinez Sanz et al. ...... 501/14 |

FOREIGN PATENT DOCUMENTS

| | | | |
|---|---|---|---|
| DE | 102004008559 | A1 | 9/2005 |
| JP | 09059037 | A | 3/1997 |
| JP | 2000128572 | A | 5/2000 |
| JP | 2004315280 | * | 11/2004 |
| WO | 2009154314 | A1 | 8/2009 |

OTHER PUBLICATIONS

Written Opinion of the Italian patent office corresponding to PI2009A000165, Dec. 2009.

Italian search report for PI2009A000165 dated May 7, 2010.
International search report for PCT/IB2010/003348 dated Sep. 15, 2011.
International Organization for Standardization, ISO 7884-8, "Glass—Viscosity and Viscometric Fixed Points—Part 8: Determination of (Dilatometric) Transformation Temperature", First Edition Dec. 15, 1987, pp. 1-4.
International Organization for Standardization, ISO 7991, "Glass—Determination of Coefficient of Mean Linear Thermal Expansion", First Edition Dec. 15, 1987, pp. 1-7.
International Organization for Standardization, ISO 9050, "Glass in Building—Determination of Light Transmittance, Solar Direct Transmittance, Total Solar Energy Transmittance, Ultraviolet Transmittance and Related Glazing Factors", Second Edition Aug. 15, 2003, pp. 1-27.
International Organization for Standardization, ISO 720, "Glass—Hydrolytic Resistance of Glass Grains at 121° C.—Method of Test and Classification", Second Edition Oct. 1, 1985, pp. 1-5.
"Testing the Resistance of Glass to Attack by Boiling Hydrochloric Acid Solution, and Classification", DIN 12116, Mar. 2001, DIN Deutsches Institut fur Normung e. V., Berlin. Beuth Verlag GmbH, pp. 1-5.
International Organization for Standardization, ISO 695, "Glass—Resistance to Attack by a Boiling Aqueous Solution of Mixed Alkali—Method of Test and Classification", Third Edition May 15, 1991, pp. 1-5.
Frieser, R.G., "A Review of Solder Glasses", Electrocomponent Science and Technology 1975, vol. 2, pp. 163-199, Gordon and Breach Science Publishers, Great Britain.
Leichtfried, G.; Thurner, R.; Weirather, "Molybdenum Alloys for Glass-to-Metal Seals", International Journal of Refractory Metals & Hard Materials 16 (1998) 13-22.

* cited by examiner

USE OF A GLASS COMPOSITION FOR MAKING A SOLAR COLLECTOR WITH A GLASS-METAL JOINT

CROSS REFERENCE TO RELATED APPLICATIONS

This application claims the priority of Italian patent application No. PI2009A000165, filed on Dec. 24, 2009 and PCT Application No. PCT/IB2010/003348, filed on Dec. 24, 2010, the disclosures of which are incorporated herein by reference in their entirety.

FIELD OF THE INVENTION

The present invention relates to a glass composition for thermal tubular solar collectors, in particular solar collectors having a glass-metal joint.

DESCRIPTION OF THE PRIOR ART

As well known, a glass-metal joint made for connecting a glass tubular container of vacuum tubular collectors is necessary to have a high fluid tightness to ensure the maintenance of the vacuum, which is used for reducing heat loss by convection and for maximizing the net thermal power transferred to the inner metal absorber of the collector.

In solar collectors, the working temperature generated by the solar radiation concentrated by parabolic reflectors on an inner metal absorber can achieve and exceed 550° C. As a consequence, also the outer transparent tubular container, which is exposed to external air and is subject to irradiation from the absorber, is subject to excursions of temperature that normally are comprised between 250° C., in the presence of a maximum solar radiation, and 50° C., without solar radiation.

The stress generated by this temperature excursion varies continuously owing to the alternation of the day and of the night and responsive to the intensity of the solar radiation and of the weather conditions. The most critical points for consequences caused by the temperature excursion are at the joint zone between the glass outer container and its metal support. Such consequences are even more severe the higher is the difference between the thermal expansion coefficients of the glass and of the metal.

Different glass compositions are known used to make glass-metal joints, with the principle of characterizing the glass with a thermal expansion coefficient comparable with that of the metal with which the joint has to be made.

For example, in DE10035801 a composition is described of a borosilicate glass used mainly in the pharmaceutical field for primary packaging. In particular, it discloses the use of the composition of the borosilicate glass to make a joint between glass and metal. In the patent it is described that, for reducing the stress that is generated at the glass-metal joint, value of the thermal expansion coefficient, or T.E.C., of the glass has to be similar to that of the metal. In particular, a value normally proposed for the T.E.C. of the glass is set between 5 and $6 \cdot 10^{-6}$ $K^{-1}$, since this value corresponds approximately to that of the metal alloys typically used in welding with the glass, often alloys of Nickel, Iron and Cobalt.

In U.S. Pat. No. 6,324,870, as state of the art, a direct connection is described between glass and metal made between a pyrex glass and a Kovar alloy (a type of alloy of Nickel, Iron and Cobalt) for X-ray vacuum tubes. In the patent various types of glass are cited used for glass-metal joints, For example glasses Schott 8245 and 8250 connected to Kovar alloys are cited, which have similar values of the thermal expansion coefficient. Connections are also described between a pyrex glass and a stainless steel ring. In both cases, the glass and the metal have different values of the thermal expansion coefficient. Therefore, the joint between the pyrex glass and the Kovar alloy is made arranging between them rings of glass with intermediate values of the T.E.C, such as glasses Schott 8447, 8448, 7740.

In U.S. Pat. No. 1,294,466 a glass-metal joint is described between a metal collar with a sharp end and a glass tube. More in detail, the patent describes a borosilicate glass composition having a low iron content, and more precisely less than 0.04% (=400 ppm), in order to achieve a high rate of transparency of the glass to the sun rays.

In DE102004008559 a method is described for making a vacuum solar tubular collector or a X-ray tube, in which the glass has the following composition by weight: $B_2O_3$ from 8 to 11.5; $Al_2O_3$ from 5 to 9; $Na_2O$ from 5 to 9; $K_2O$ from 0 to 5; CaO from 0.4 to 1.5; and SiO2.

However, the glass compositions as above indicated, even if they ensure good glass-metal joints for certain objects, i.e. solar collectors or X-ray tubes, have a limited resistance against thermal fatigue, with subsequent reduced performances versus duration time of the features of hermetic tightness and of heat insulation in the final product.

It is clear then that for making thermal tubular solar collectors a problem of mechanical stability exists of the glass at the joint between glass and metal caused by the thermo-mechanical actions in cyclical operation. Such instability typically causes break of the glass, which is the most fragile component, with subsequent loss of hermetic tightness and life of the whole collector.

So, a need exists of developing glasses with different features from the presently known ones, that, under the same specific requirements for example versus transparency and transmittance, ensure a better stability to the cyclic thermo-mechanical actions typical of the use of the joint.

SUMMARY OF THE INVENTION

It is then a feature of the present invention to provide a glass composition for thermal tubular solar collectors having a glass-metal joint that is capable of increasing the resistance against thermal fatigue of the final welded product.

It is also a feature of the present invention to provide a glass composition for thermal tubular solar collectors having a glass-metal joint that makes it possible to obtain a glass transition temperature (Tg) that is suitably low, maintaining the other chemical physical characteristics at optimal level.

It is another feature of the present invention to provide a glass composition for thermal tubular solar collectors having a glass-metal joint that makes it possible to obtain a glass with a thermo-mechanical behaviour that is improved with respect to products of the prior art, so that the thermal contraction of the glass after welding is optimized, in order to fit to that of the metal.

It is also a feature of the present invention to provide a glass composition for thermal tubular solar collectors having a glass-metal joint that makes it possible to optimize the joint at the production step by heat treatments, in order to minimize the stress between glass and metal, and, in particular, the typical thermo-mechanical actions of the working conditions of the collectors, in a temperature range as wide as possible corresponding to the operation conditions.

It is a further feature of the present invention to provide a glass composition for thermal tubular solar collectors having a glass-metal joint that is adapted to optimize the performances of the thermal solar tubular collector versus hermetic fluid tightness.

It is also a feature of the present invention to provide a glass tubular container, made with this composition, for use in a thermal tubular solar collectors having a glass-metal joint.

According to a first aspect of the invention, the use is defined of a glass to make a tubular solar collector, wherein said glass is arranged to make a glass-metal joint, wherein said glass has the following composition by weight:
5% to 8% $Na_2O$,
0.1% to 3% $K_2O$,
0.1% to 1.5% CaO,
5% to 7.5% $Al_2O_3$,
70% to 75% $SiO_2$,
wherein said glass comprises, furthermore:
11.6% to 13.7% $B_2O_3$ According to another aspect of the invention, a glass tubular container that is adapted to make a tubular solar collector comprising a tubular glass body and parts of metal connected to said glass, in order to provide a direct glass-metal joint, wherein said glass has the following composition by weight:
5% to 8% $Na_2O$,
0.1% to 3% $K_2O$,
0.1% to 1.5% CaO,
5% to 7.5% $Al_2O_3$,
70% to 75% $SiO_2$,
wherein that said glass comprises, furthermore:
11.6% to 13.7% $B_2O_3$ In another aspect of the invention, a glass composition of a tubular glass body of a tubular solar collector is provided that is adapted to make a glass-metal joint, said composition characterized by a borosilicate glass such that said glass has a glass transition temperature in cooling (Tgc) less than the glass transition temperature in heating (Tgh) for a temperature difference ($\Delta T$=Tgh−Tgc) higher than 20° C., in particular higher than 30° C., preferably higher than 40° C., wherein said borosilicate glass has the following composition by weight:
5% to 8% $Na_2O$,
0.1% to 3% $K_2O$,
0.1% to 1.5% CaO,
5% to 7.5% $Al_2O_3$,
70% to 75% $SiO_2$,
11.6% to 13.7% $B_2O_3$.

In a possible embodiment, said composition comprises:
$SiO_2$: 70.5%-71.6%,
$B_2O_3$: 11.8%-13.5%,
$Al_2O_3$: 5.9%-6.8%,
$Na_2O$: 6.4%-7.0%,
$K_2O$: 2.0-2.50%,
CaO: 0.5-1.0%,
MgO: 0.001-0.25%,
$Li_2O$: 0.001-0.20%,
BaO: 0.001-2.00%.

According to a further aspect of the invention, a method for making a solar collector having a tubular glass body that is adapted to make a glass-metal joint, comprises the steps of:
choosing a metal support having a predetermined dilatometric curve,
prearranging a tubular glass body, wherein said tubular glass body has a predetermined glass transition temperature in heating Tgh, a predetermined glass transition temperature in cooling Tgc and a predetermined melting point;
making said glass-metal joint between said tubular glass body and said support;
heating said joint up to an annealing temperature beyond the glass transition temperature in heating Tgh of said glass but below the melting point;
holding the joint at the annealing temperature for a predetermined annealing time;
cooling according to a predetermined cooling curve said joint below said glass transition temperature in cooling Tgc;
wherein said annealing temperature, said annealing time and said cooling chart are chosen such that said tubular glass body has a dilatometric cooling curve as far as possible coincident to said dilatometric curve of said metal support
and wherein said tubular glass body has a composition of a borosilicate glass such that said glass has a glass transition temperature in cooling (Tgc) less than the glass transition temperature in heating (Tgh) for a temperature difference ($\Delta T$=Tgh−Tgc) higher than 20° C., in particular higher than 30° C., preferably higher than 40° C.

Advantageously, the glass of said tubular body has a glass transition temperature in cooling less than 600° C., preferably less than 550° C.

Preferably, said borosilicate glass has the following composition by weight:
5% to 8% $Na_2O$,
0.1% to 3% $K_2O$,
0.1% to 1.5% CaO,
5% to 7.5% $Al_2O_3$,
70% to 75% $SiO_2$,
11.6% to 13.7% $B_2O_3$.

Advantageously, said metal support is made of an iron, nickel and cobalt alloy (Kovar).

Advantageously, said composition comprises $B_2O_3$ between 11.8% to 13.5%, in particular between 11.8% to 13.1%.

In a possible embodiment, said composition comprises, furthermore, an oxide selected among,
0.01% to 1.0% MgO,
0.01% to 1% $Li_2O$,
0.01% to 2% BaO,
a combination thereof.

The above described composition, in its exemplary embodiments, as above defined, surprisingly, owing to the choice of the $B_2O_3$ in the indicated range, in combination with the other components, has a glass transition temperature lower than other borosilicate glasses, and then is adapted to be used to make a tubular glass body for a solar collector.

Concerning the possible addition of $Li_2O$, it is a flux component that allows a better glass fluidification, and then a higher plasticity at distension.

Concerning the possible addition of MgO, it provides a higher glass lattice stability, and then higher resistance against fracture in case of thermal fatigue.

Concerning the possible addition of BaO, it also provides a higher glass lattice stability, and then higher resistance against fracture in case of thermal fatigue.

According to what above defined, by choosing a metal support having a predetermined dilatometric chart, for example made of an iron, nickel and cobalt alloy, or a molybdenum alloy, and using one of the possible compositions according to the invention to provide the tubular glass body, it is possible to exploit the features of such a glass in which the glass transition temperature in cooling is significantly less than the glass transition temperature in heating.

In particular, cooling the glass after the welding step according to a predetermined cooling curve, to a predetermined stress relaxation temperature that is chosen close to the glass transition temperature in cooling, and maintaining it at that temperature for a predetermined stress relaxation time, and then cooling the joint according to a predetermined cooling curve, it is possible to cause the tubular glass body cooling phase to follow a desired dilatometric cooling curve such that it matches, as far as possible, the dilatometric curve of said metal support, in order to obtain a dilatometric variation as far as possible coincident for the two materials, at the desired temperature.

In other words, owing to the low glass transition temperature of the composition according to the invention, it is possible to exploit the hysteresis and the shape of the dilatometric curve of the glass in cooling and heating, to achieve and ideal stress relaxation point, and then to pilot the cooling phase so that the dilatometric cooling curve of the glass "matches" the dilatometric curve of the metal, in particular in the working temperature range of the outer container of the solar collector, in order practically to zero the stress at the joint in the working temperature range of the tubular container of the collector, normally set between 50° C. and 250° C.

In particular, said ideal stress relaxation temperature of the glass having the above described composition is selected between: 500° C. and 590° C., and preferably at the lower end of this range (between 500° C. and 520° C.) or at the upper end (between 570° C. and 590° C.).

The invention will be now shown with the following description of some exemplary embodiments, exemplifying and not limitative, with reference to the attached drawings in which.

Figure 3:
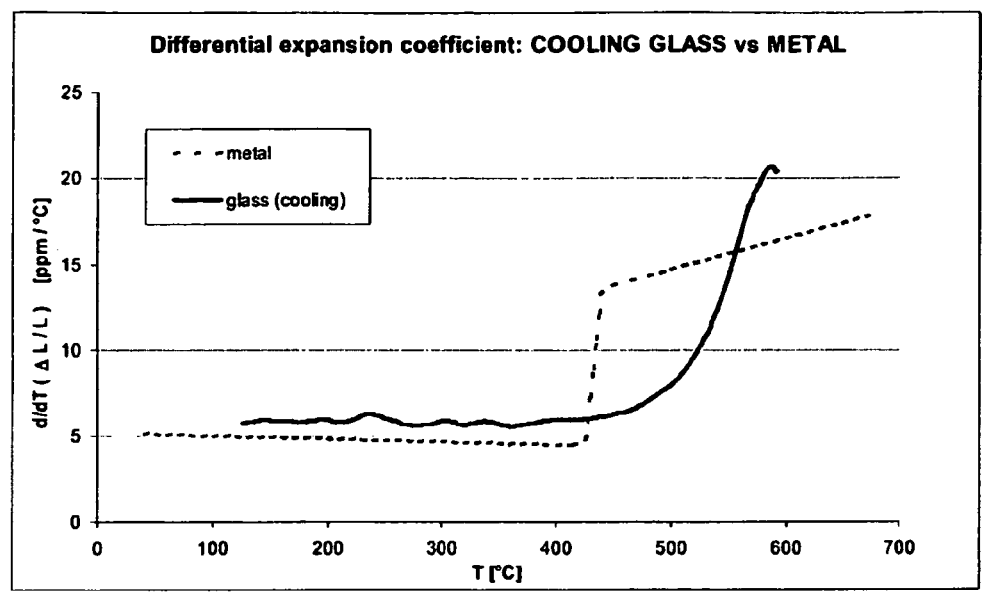
Figure 4:
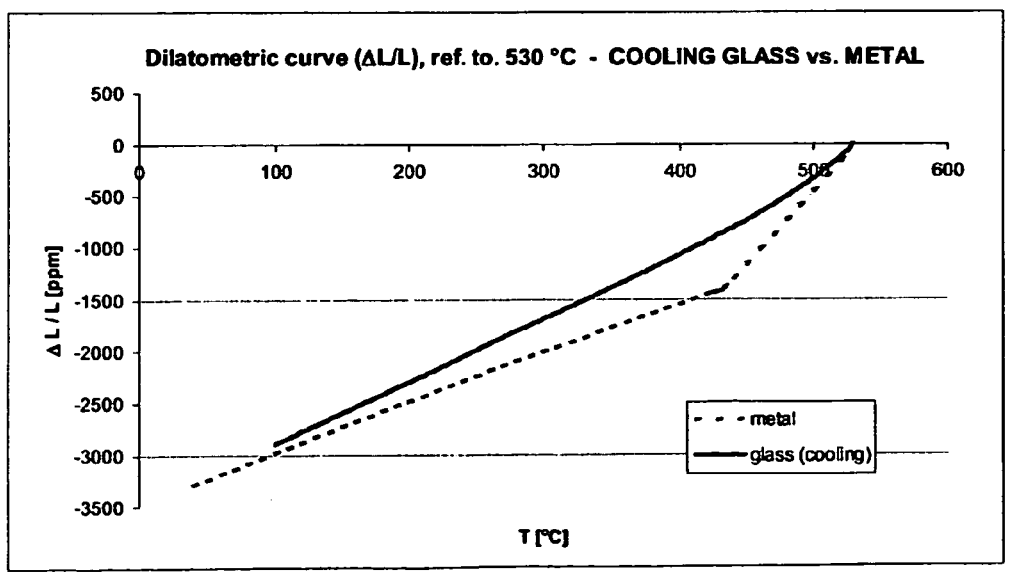
Figure 5:
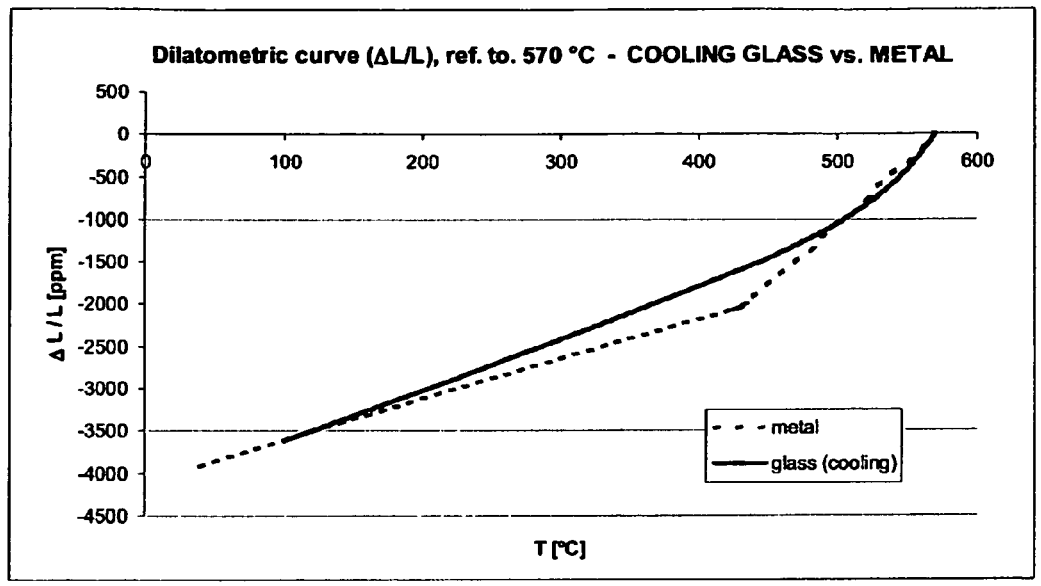
Figure 6:
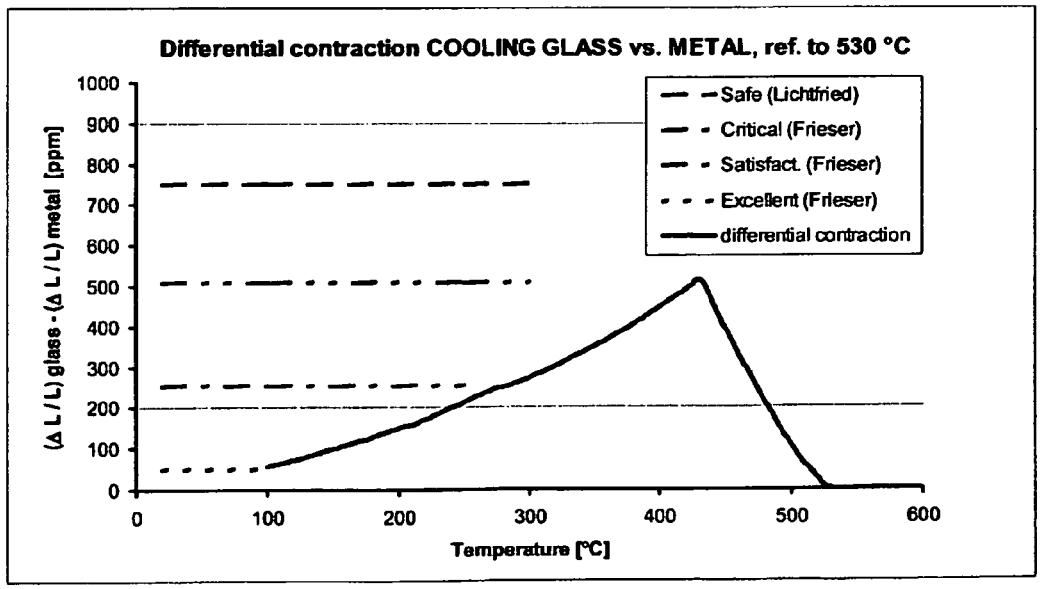
Figure 7:
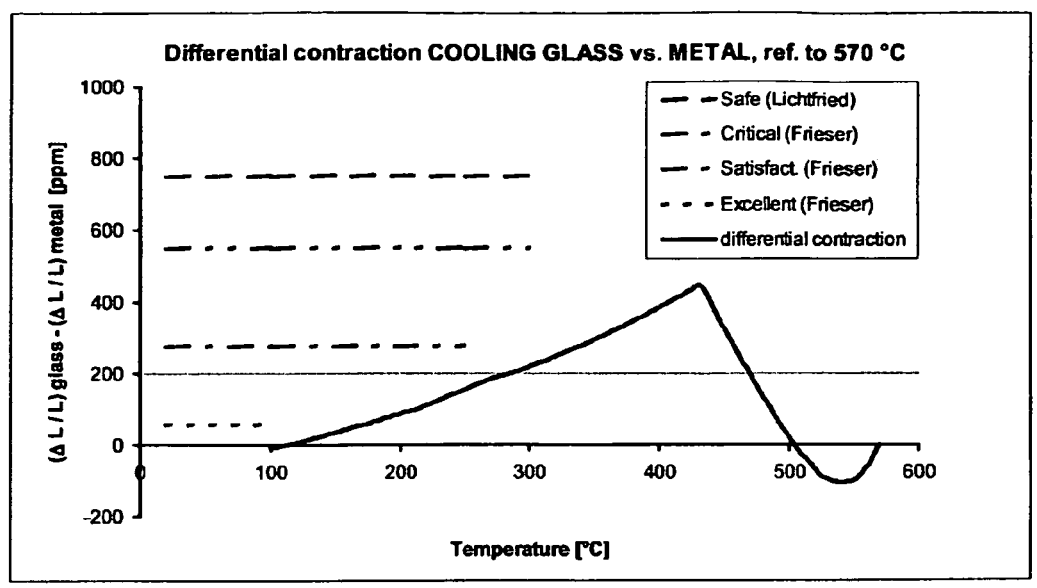

In FIG. 3 the trend is shown of the thermal expansion coefficient of a glass according to the invention with decreasing temperature, compared to the thermal expansion coefficient of a metal belonging to the class of the Fe—Ni—Co alloys typically used in these applications;

In FIG. 4 an example is shown of the trend of the thermal negative expansion chart of a glass according to the invention, referenced to a stress relaxation temperature;

In FIG. 5 another example is shown of the trend of the thermal negative expansion curve of a glass according to the invention, referred to a stress relaxation temperature;

In FIG. 6 the trend is shown of the difference between the trend of the thermal contraction ($\Delta L/L$) glass when cooling the glass according to the invention, and that of the metal ($\Delta L/L$) metal, responsive to the temperature (T), after having followed the stress relaxation and the cooling of FIG. 4;

In FIG. 7 the trend is shown of the difference between the thermal contraction of the glass ($\Delta L/L$) glass when cooling according to the invention, and that of the metal ($\Delta L/L$) metal, responsive to the temperature (T), after having followed the stress relaxation and the cooling of FIG. 5.

DESCRIPTION OF THE PREFERRED EMBODIMENTS

The following are examples of some possible glass compositions for thermal tubular solar collectors, according to the present invention with the corresponding values of Tg, Wp, Littleton, α, te, H.R., Ac.R., Alk.R. Whose meaning are synthesized hereinafter:

Tg° C.—Transformation temperature of the glass, measured according to ISO-7884-8

Wp° C.—Working point (workability), temperature at which the viscosity of the glass is equal to $10^4$ Littleton° C.—Softening point (Littleton softening temperature), temperature at which the viscosity of the glass is equal to $10^{7.6}$ α (20-300° C.)—average expansion coefficient between 20 and 300° C. according to ISO-7991

τe (ISO9050)—total transmittance between 300 and 2500 nm, according to ISO 9050

H.R. (ISO 720)—Hydrolytic resistance, according to ISO 720

Ac.R. (DIN 1216)—Resistance against acid attack, according to DIN 111216

Alk.R. (ISO 695)—Resistance against alkaline attack, according to ISO 695

| | |
|---|---|
| SiO₂ | 71.35% |
| B₂O₃ | 11.80% |
| Al₂O₃ | 6.80% |
| Na₂O | 6.80% |
| K₂O | 2.50% |
| CaO | 0.75% |
| Tg ° C. | 557.00 |
| Wp ° C. | 1106.00 |
| Littleton ° C. | 783.00 |
| α | 53.80 |
| Te | 91.50 |
| H.R. | 1 |
| Ac.R. | 1 |
| Alk. R. | 2 |

| | |
|---|---|
| SiO2 | 71.50% |
| B₂O₃ | 13.5% |
| Al₂O₃ | 6.10% |
| Na₂O | 6.30% |
| K₂O₃ | 2.10% |
| CaO | 0.50% |
| Tg ° C. | 555.00 |
| Wp ° C. | 1110.00 |
| Littleton ° C. | 781.00 |
| α | 53.00 |
| Te | 91.50 |
| H.R. | 1 |
| Ac.R. | 1 |
| Alk. R. | 2 |

| | |
|---|---|
| SiO₂ | 71.35% |
| B₂O₃ | 11.80% |
| Al₂O₃ | 6.80% |
| Na₂O | 6.80% |
| K₂O | 2.50% |
| CaO | 0.50% |
| MgO | 0.25% |
| Tg ° C. | 560.00 |
| Wp ° C. | 1108.00 |
| Littleton ° C. | 782.00 |
| α | 54.00 |
| Te | 91.50 |
| H.R. | 1 |
| Ac.R. | 1 |
| Alk. R. | 2 |

| | |
|---|---|
| SiO₂ | 71.55% |
| B₂O₃ | 12.30% |
| Al₂O₃ | 6.80% |
| Na₂O | 6.50% |
| K₂O₃ | 2.10% |
| CaO | 0.50% |
| MgO | 0.25% |
| Tg ° C. | 555.00 |

-continued

| | |
|---|---|
| Wp ° C. | 1110.00 |
| Littleton ° C. | 781.00 |
| α | 53.00 |
| Te | 91.80 |
| H.R. | 1 |
| Ac.R. | 1 |
| Alk. R. | 2 |

| | |
|---|---|
| SiO$_2$ | 71.63% |
| B$_2$O$_3$ | 13.10% |
| Al$_2$O$_3$ | 5.90% |
| Na$_2$O | 6.40% |
| K$_2$O | 2.00% |
| CaO | 0.77% |
| Li$_2$O | 0.20% |
| Tg ° C. | 565.00 |
| Wp ° C. | 1090 |
| Littleton ° C. | 765.00 |
| α | 52.60 |
| Te | 91.80 |
| H.R. | 1 |
| Ac.R. | 1 |
| Alk. R. | 2 |

| | |
|---|---|
| SiO2 | 70.60 |
| SiO$_2$ | 13.00% |
| B$_2$O$_3$ | 5.90% |
| Al$_2$O$_3$ | 6.30% |
| Na$_2$O | 2.00% |
| K$_2$O | 0.77% |
| BaO | 1.40% |
| Tg ° C. | 570.00 |
| Wp ° C. | 1099.00 |
| Littleton ° C. | 771.00 |
| α | 52.50 |
| Te | 91.60 |
| H.R. | 1 |
| Ac.R. | 1 |
| Alk. R. | 2 |

| | |
|---|---|
| SiO$_2$ | 70.55 |
| B$_2$O$_3$ | 13.10% |
| Al$_2$O$_3$ | 5.75% |
| Na$_2$O | 6.32% |
| K$_2$O | 2.00% |
| CaO | 0.7% |
| Li$_2$O | 0.20 |
| BaO | 1.35 |
| Tg ° C. | 570.00 |
| Wp ° C. | 1099 |
| Littleton ° C. | 771.00 |
| te | 91.75 |
| H.R. | 1 |
| Ac.R. | 1 |
| Alk. R. | 2 |

| | |
|---|---|
| SiO$_2$ | 70.60 |
| B$_2$O$_3$ | 13.00% |
| Al$_2$O$_3$ | 5.90% |
| Na$_2$O | 6.30% |
| K$_2$O | 2.00% |
| CaO | 0.77% |
| BaO | 1.40% |
| Li$_2$O | 0.20 |
| MgO | 0.25% |
| Tg ° C. | 570.00 |

-continued

| | |
|---|---|
| Wp ° C. | 1099.00 |
| Littleton ° C. | 771.00 |
| α | 52.50 |
| Te | 91.60 |
| H.R. | 1 |
| Ac.R. | 1 |
| Alk. R. | 2 |

In addition to the above described examples, many other are possible, where B$_2$O$_3$ is between 11.6% and 13.7%, in particular between 11.8% and 13.5%, and preferably between 11.8% and 13.1%, and the other components defined consequently, with similar thermo-mechanical results, in order to obtain a glass-metal joint that is ideal to make a solar collector.

In a possible embodiment, said composition comprises, furthermore, an oxide selected among,
0.01% to 1.0% MgO,
0.01% to 1% Li$_2$O,
0.01% to 2% BaO,
a combination thereof.

The above described compositions show a relevant capacity of meeting any of the above described objects. In particular, there is a glass transition temperature less than 20-30° with respect to glasses of the prior art used for glass-metal joints in vacuum tubes.

Not only, but the above described compositions also have a glass transition temperature in cooling Tgc less than the glass transition temperature in heating Tgh for a temperature difference (ΔT) higher than 20°, and in the cases above indicated about 40° (with Tgh determined according to ISO-7884-8 and Tgc determined with similar methodology).

This makes it possible to exploit at best the dilatometric hysteresis that occurs between heating and cooling, as better shown below.

In particular, in the attached figures the trends are shown of the main parameters responsive to the temperature (t) for a glass having the composition according to example 1, according to the present invention. Similar trends are achieved by the compositions of examples 2, 3, 4 and 5.

Figure 1:
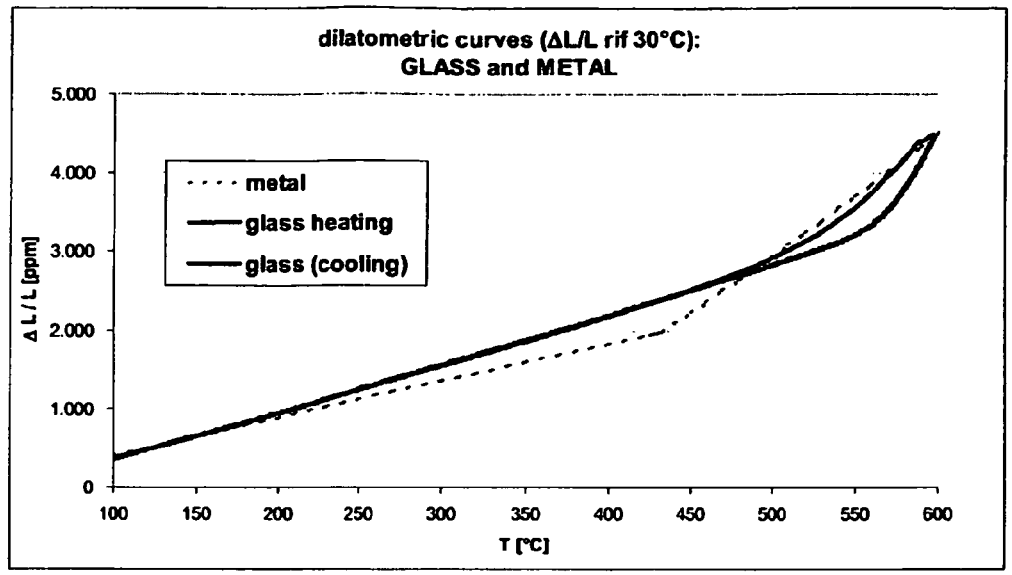
FIG. 1 shows the trend of the variation of the length $\Delta L/L$ of a glass according to the invention.

As shown in FIG. 1, the trend of the variation relative of the length ΔL/L of the glass responsive to the temperature (T) is substantially linear, in the range between 100° C. and 500° C., both during the heating step and during the cooling step.

In the same FIG. 1 it is shown, in particular between 500° and 600°, a gradual increase of the thermal expansion (increase of the slope of the dilatometric chart curve), which is evidence of the glass transition. It is apparent also that the dilatometric behaviour has hysteresis responsive to the temperature increase or decrease in this zone, i.e. it has a different evolution between what occurs at heating and what occurs in a successive cooling. The separation between the two curve segments is even more apparent the higher is the temperature at which the growth of temperature is reversed and cooling starts, and depends on the rapidity of the temperature variation, i.e. on the cooling chart curve segment.

Figure 2:
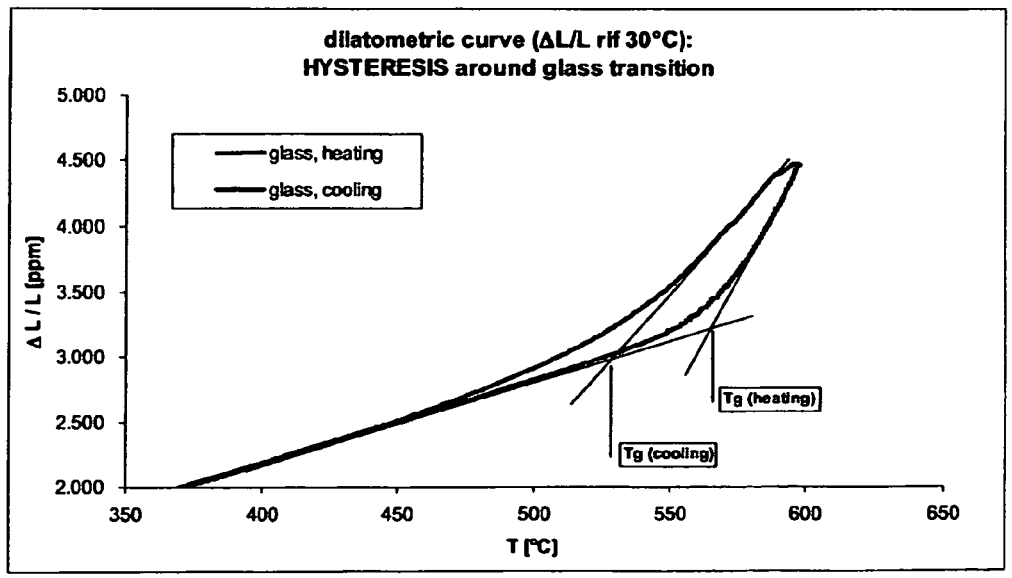
FIG. 2 shows an enlarged view of the trend of FIG. 1.

In particular, this hysteresis is characterized by a lower soft-segment glass transition temperature in cooling (Tgc) (FIG. 2). In particular, both glass transition temperatures Tgh and Tgc are shown for two trends, heating and cooling.

A lower glass transition temperature allows, according to the invention, to hold the glass in the plastic state up to a temperature lower than other glasses of the prior art used for solar collectors, and therefore of delaying the onset and the accumulation of tensions, when the glass-metal joint brought back to room temperature after the welding step.

Furthermore, the presence of the hysteresis in the dilatometric trend and the fact that the cooling trend depends on a maximum temperature achieved (inversion temperature), as well as on the cooling speed, determines a further variable when cooling and then a further degree of freedom in optimizing the stress resulting at the end of the cooling process.

With reference to FIG. 3, the trend of the thermal expansion coefficient ($\alpha$) determined with decreasing the temperature (T), compared to the thermal expansion coefficient of the metal (broken line) indicates that the transition of the metal (a iron, nickel, cobalt alloy) occurs with a quick increase of the thermal expansion coefficient.

Both trends show a substantially constant portion up to about 430° C. Above this temperature, both materials have a quick growth of the T.E.C. ($\alpha$). The metal has a transition for passing the temperature of Curie, whereas the glass has a characteristic glass transition temperature.

It is observed that the expansion coefficient of the glass is slightly more than the metal at a temperature lower than the transition point, whereas at higher temperatures is initially lower, then, from about 450° C., it increases up to passing it about at 540° C., and finally decreases again, such that the matching between the T.E.C. of the glass and of the metal is achieved in way, so-called, on average.

The variability of these trends suggests that it is not enough to characterize dilatometrically the glass on an average thermal expansion coefficient determined between 30 and 300° C. (ASTM standard), but it is necessary to extend the determination up to much higher temperatures.

Since the stresses are generated both by the difference between stretching or shortening effects of the two materials from the starting condition where they are welded down to the generic final temperature of interest, it is necessary to follow carefully the trend of the specific length variations $\Delta L/L$ of the two materials.

In particular, it is understood that what determines the stresses is the difference of the relative length variation $(\Delta L/L)_{metal} - (-L/L)_{glass}$, where both terms have to be referred to the starting condition where the parts are in contact and are welded in conditions of zero stress ("set-up" condition). Since from the "starting" temperature, the temperature has to decrease, the $(\Delta L/L)_{metal}$ and $(\Delta L/L)_{glass}$ charts referring to said temperature are called "in thermal contraction" or "when cooling".

This condition is achieved in practice, when carrying out the welding step, heating the glass much beyond the Tg, such that it melts and remains on the metal, which can be suitably preoxidized, in order to achieve a chemical bound, while it is still in the plastic state, without any stresses. Starting from this point, while the joint is cooled below the transition temperature Tg, the glass looses gradually the capacity of sliding plastically, and starts to generate stresses caused by the different shrinkage of the two materials.

Therefore the setting temperature, notwithstanding undefined, is not far from Tgc, i.e. on the glass transition temperature in cooling, and then as above said, it is determined by the choice of the inversion temperature (maximum temperature), and by the rapidity with which cooling is carried out.

It is possible to return the joint back to the setting condition, for example with a different temperature, by means of stress relaxation. The joint is brought back to a temperature a little bit higher than the glass transition temperature in heating TO, and then cooled to the desired temperature, where it is held for a time enough to make it possible a plastic slipping of the glass, such that the stresses are again annealed. Then the new setting condition thus obtained is then affected by the maximum temperature, by the mode of cooling down to the selected setting temperature, by the time of holding the material at said setting temperature, and by the successive cooling mode.

The presence of the hysteresis, the presence of a reduced glass transition temperature in cooling, the subsequent availability of a wide temperature range where stress relaxation can be effected, as well as the possibility of adjusting within certain limits the dilatometric behaviour of the glass when cooling according to the stress relaxation conditions, allow, according to the invention, to optimize the "starting" conditions and then to determine the dilatometric trend at the working temperature so that the difference between the relative dilation between metal and glass $(\Delta L/L)_{metal} - (\Delta L/L)_{glass}$ is minimized and, in particular, zeroed in the desired temperature range, as required by the use of the junction.

This causes that throughout each thermal cycle the solar collector during its operative life undergoes to stresses in the joint that are at a minimum or in particular are zeroed, reducing the thermal fatigue at the joint.

In FIGS. 4 and 5, dilatometric curves are shown when cooling, for different values of the "starting" temperature, obtainable with different stress relaxation cycles, starting from the same composition of example 3.

In FIG. 4, the dilatometric trend when cooling is referred to a starting temperature at 570°. It is observed that the glass shrinks at first more quickly than the metal, down to about 540° C. in a condition of light stress, due to a differential dilation of about 100 ppm. Such stress decreases as soon as the metal starts shrinking more quickly than the glass, up to zeroing about at 500° C. Then, the metal continues to shrink more than the glass, bringing the latter to increasing compression, at about 430° C., where the transition of the metal occurs. In this point there is a maximum thermo-mechanical action at the joint (about 500 ppm of differential stretching), where the glass is forced to compression and the metal to tension. Decreasing temperature further the two curves approach a substantial reduction of the stress, at about at 100° C., since the difference between the specific contractions of the two materials is reduced much below 100 ppm.

In substance, the example shows achieving a condition of substantial absence of stress, capable of ensuring, according to the invention, long duration at room temperature of a solar collector having a glass-metal joint, obtained with a glass composition according to the invention.

Always in the same FIG. 4, a further advantage is apparent to provide a whole temperature wide range, between 0 and 300°, where the dilatometric curves are about parallel to each other, such that the status of stress is kept very low in all the range.

Therefore, the composition according to the present invention provides a glass that has a trend of the thermal expansion coefficient that is adapted to be used in glass-metal weldings, in particular, with Iron-Nickel-Cobalt alloys or molybdenum alloys.

This permits, according to the invention, to improve the performances versus resistance against thermal fatigue, i.e. on reliability of the solar collector having a glass-metal joint, obtained with a glass of a composition according to the invention, in its operative life.

In FIG. 5 another example is shown of the trend of the thermal negative expansion curve of a glass according to the invention, referred to a different temperature at which the cooling phase is started. In substance, choosing a stress relaxation temperature of 580°, under a same stress relaxation time and cooling chart, a "matching" is obtained between the two charts optimised for a higher working temperature range.

In FIGS. 6 and 7, the trend is shown of the difference between the thermal contraction of the $(\Delta L/L)_{glass}$ when cooling, of the glass treated as in the respective FIGS. 4 and 5, and the thermal contraction of the metal $(\Delta L/L)_{metal}$, responsive to the temperature (T); it can be seen, by reading the curve from the right towards the left, that the differences induced by the cooling path causes stresses in the zone of the joint. The trend is correlated with the calculated acceptability limits defined in literature in particular by R. G. Frieser "A Review of Solder Glasses" (Electrocomponent Science Technology, 1975, Vol 2, pp 163-199), for determining the quality at room temperature of a "matched seals" type welding as Δ(T.E.C.). This way, an "eccellent" welding is obtained for Δ(T.E.C.) up to $0.1 \cdot 10^{-6}$, "satisfactory" for Δ(T.E.C.) up to $0.5 \cdot 10^{-6}$, "critical" for Δ(T.E.C.) up to $1 \cdot 10^{-6}$, and "break" for a much higher Δ(T.E.C.).

The article of Frieser considers the deviation between the values of the T.E.C., which is determined typically as average thermal expansion coefficient as the temperature rises in the range 30° C.-300° C., without considering the dilatometric chart trend at the higher temperatures. In order to bring them into this analysis, since $$(\Delta L/L)_{glass} - (\Delta L/L)_{metal} \equiv \Delta(T.E.C.)_{average} \cdot \Delta T$$

said limit values have been multiplied for the amplitude of the thermal range, i.e. the range between the welding temperature and the room temperature.

According to what G. Leichtfried proposes in the article "Molybdenum alloys for glass-to-metal seals" (International Journal of Refractory & Hard Materials 16 (1998) 13-22 of Elsevier) the limit of acceptability for a welding of the "matched seal" type is the following formula:

$$ABS(T.E.C._{Glass} - T.E.C._{Metal}) \cdot \Delta T \leq 7.5 \cdot 10^{-4}$$

where the T.E.C.s are determined as average values in the temperature range between the welding temperature and the minimum temperature achieved; ABS=absolute value; ΔT is the amplitude of the same temperature range.

This criteria is suitable for better to test the quality of the "matched seal" even at different temperatures starting from the room temperature, in particular when the trend of the determined glass AUL is available with continuity starting from the welding temperature, and, in particular, when cooling the glass. In fact the first member of this equation is exactly, by definition, the parameter of FIG. 5:

$$(\Delta L/L)_{glass} - (\Delta L/L)_{metal} \equiv \Delta(T.E.C.)_{average} \cdot \Delta T.$$

In the whole temperature range, and, in particular, at room temperature and in the working temperature range 100°-300°, the product Δ(T.E.C)·ΔT is kept always within the limit, in confirmation of the good behaviour of the glass having the composition according to the invention.

The use of the glass having the composition according to the invention, therefore, and, in particular, the possibility of stress relaxation that can be effected in order to optimize the "starting" conditions, avoids the development of stress at the glass-metal welding and then makes it possible to obtain a performance with optimal reliability in operation conditions.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A glass composition of a tubular glass body of a tubular solar collector, that is adapted to make a glass-metal joint, said composition characterized by a borosilicate glass, wherein said glass has a glass transition temperature in cooling (Tgc) less than the glass transition temperature in heating (Tgh) for a temperature difference (ΔT=Tgh−Tgc) higher than 20° C., wherein said borosilicate glass has the following composition by weight:
$SiO_2$: 70.5%-71.6%,
$B_2O_3$: 11.8%-13.5%,
$Al_2O_3$: 5.9%-6.8%,
$Na_2O$: 6.4%-7.0%,
$K_2O$: 2.0-2.50%,
CaO: 0.5-1.0%,
MgO: 0.001-0.25%,
$Li_2O$: 0.001-0.20%, and
BaO: 0.001-2.00%.

* * * * *